United States Patent [19]

Gautier et al.

[11] Patent Number: 5,094,560

[45] Date of Patent: Mar. 10, 1992

[54] PERIPHERAL PROTECTION DEVICE

[75] Inventors: Jean-Pierre Gautier, Aulnay-Sous-Bois; André Debuire, Drancy, both of France

[73] Assignee: Bendix Europe Services Techniques, Drancy, France

[21] Appl. No.: 620,162

[22] Filed: Nov. 30, 1990

[30] Foreign Application Priority Data

Dec. 22, 1989 [FR]  France ................................ 89 17045

[51] Int. Cl.$^5$ ............................................. F16B 11/00
[52] U.S. Cl. ..................................... 403/23; 403/338; 403/341
[58] Field of Search ................... 403/338, 335, 341, 23

[56]  References Cited

U.S. PATENT DOCUMENTS 4,351,390  9/1982  Argyle et al. ........................ 403/338

FOREIGN PATENT DOCUMENTS 0300857  1/1989  European Pat. Off. .
3103999  1/1981  Fed. Rep. of Germany .
2540810  2/1983  France .
2136520  9/1984  United Kingdom .

Primary Examiner—Andrew V. Kundrat
Attorney, Agent, or Firm—Larry J. Palguta; Ken C. Decker

[57]  ABSTRACT

A peripheral protection device for two metal pieces (10, 12) fitted into one another and having a general flange shape, the first (12) of which has an edge (18) extending outwards and the second (10) of which has a marginal zone, a first part (14) of which has substantially the form of a capital S whose vertical axis is substantially parallel to the edge (18) and a second part (16) of which is substantially perpendicular to the edge (18) consists of an arc having, in section, the general form of the capital letter C enclosing the edge (18) and the marginal zone.

5 Claims, 1 Drawing Sheet

PERIPHERAL PROTECTION DEVICE

BACKGROUND OF THE INVENTION

The present invention relates to a peripheral protection device for two metal pieces fitted into one another and having a general flange shape, the first of which has an edge extending outwards and the second of which has a marginal zone, a first part of which has substantially the form of a capital S whose vertical axis is substantially parallel to the edge and a second part of which is substantially perpendicular to the edge.

These metal pieces are, for example, those used in order to construct a depression servomotor generally employed in power-assisted braking in motor vehicles.

The documents EP-A-0,072,602 and EP-A-0,300,857 describe such servomotors.

The place reserved for the servomotor in the vehicle thus equipped is often very small and bundles of electrical cables may be disposed in the immediate vicinity thereof.

In this case, the vibrations inherent in the vehicle can cause wearing of the cables and, consequently, cause the exposure of a conducting core which has an electrical voltage which is different from that of the servomotor. It is thus necessary to equip the servomotor with a protection device which tends to avoid such wear.

In this case, a person skilled in the art generally disposes an insulating film by adhesive bonding on the corresponding part of the servomotor. However, such a film has the disadvantage of ageing unsatisfactorily due to its environment and of rapidly becoming detached.

SUMMARY OF THE INVENTION

The object of the present invention is to remedy this disadvantage.

According to the invention, the protection device consists of an arc having, in section, the general form of the capital C enclosing the edge and the marginal zone.

The upper arm of the C is preferably housed between the wall of the first metal piece and the second part of the second metal piece, while the lower arm is received in the hollow part of the first part of the marginal zone.

Additionally, the distance between the ends of the upper and lower arms of the C is preferably substantially equal to that between the hollow part and the edge and less than the length of the second part.

BRIEF DESCRIPTION OF THE DRAWINGS

The invention will be better understood and other objects, advantages and features will become more clearly apparent on reading the following description of a preferred embodiment which is given in an non-limiting manner and to which a plate of drawings is appended, wherein.

DETAILED DESCRIPTION OF THE INVENTION

Figure 1:
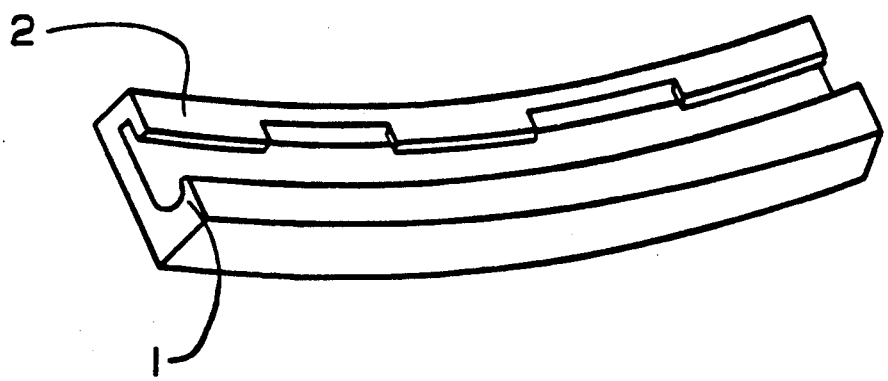
FIG. 1 shows diagrammatically in perspective a device according to the invention.
Figure 2:
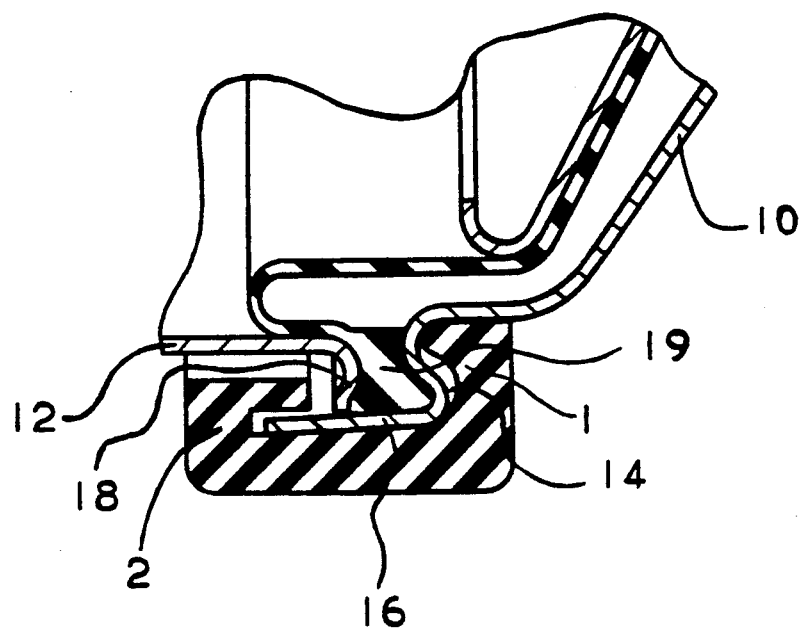
FIG. 2 shows diagrammatically the device according to the invention disposed on a servomotor, in axial section according to a plane in which the two pieces are not crimped.
Figure 3:
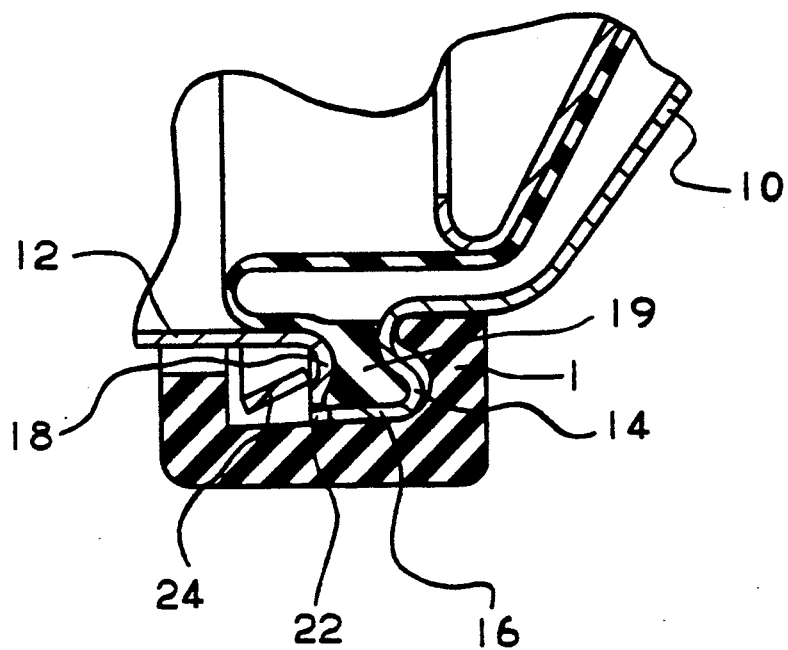
FIG. 3 is identical to FIG. 2, except that the axial section is constructed according to a plane in which the two pieces are crimped.

Referring, now, to the Figures, the casing of the servomotor consists of two metal pieces 10, 12 in the form of a flange. The first piece 12 has an edge 18 extending outwards. The second piece 10 comprises a marginal zone, a first part 14 of which substantially has the form of the letter S whose vertical axis is substantially parallel to the above-mentioned edge 18, and a second part 16 of which is substantially perpendicular to the edge 18. A deformable seal 19 is enclosed between the edge 18 and the S-shaped part 14.

The two pieces are crimped together by deformation or stamping of a zone 24 close to a corresponding plurality of apertures 22 made in the second part 16.

In section perpendicular to the axis, the protection device according to the invention has the form of an arc and, in axial section, the general form of a capital C having an upper arm 2 and a lower arm 1.

The device encases the edge 18 and the marginal zone 14, 16. To this end, the upper arm 2 is housed in the space provided between the wall of the piece 12 and the end of the part 16 of the piece 10, while the lower arm 1 is received in the hollow part of the part 14 of the marginal zone.

The distance between the ends of the upper and lower arms of the C is very slightly greater than that between the hollow part and the edge and smaller than the length of the second part.

The upper arm 2 of the C is preferably absent opposite each of the deformed zones 24.

This results in a reliable protection device made from a resilient material which is deformed only when it is positioned and which undergoes no subsequent deformation.

Such a device preferably extends between 20 and 90° of angle according to the circumference of the flange and, preferably, 45°.

A person skilled in the art will be able to contribute several modifications to the device according to the invention. For example, it may be equipped with a means making it possible to fix electrical cables thereto.

What we claim is:

1. A peripheral protection device for two metal pieces fitted into one another and having the general shape of a flange, the first of which has an edge extending outwards outwardly and the second of which has a marginal zone, a first part of which has substantially the form capital S whose vertical axis is substantially parallel to said edge and a second part of which is substantially perpendicular to said edge, said device consisting of an arc having, in section, the general form of the capital letter C enclosing said edge and said marginal zone.

2. The protection device according to claim 1, wherein an upper arm of the C is housed between a wall of the first metal piece and said second part of the second metal piece, while a lower arm of the C is received in a hollow part of the first part of the marginal zone.

3. The protection device according to claim 2, wherein the distance between ends of the upper and lower arms of the C is substantially equal to that between said hollow part and said edge and less than the length of said second part.

4. The protection device according to claim 1, wherein said metal pieces are crimped together by deformation of certain zones and an upper arm of the C is absent opposite said zones.

5. The protection device according to claim 1, wherein the device covers between 20° to 90° of the circumference of the flange.

* * * * *